Patented Jan. 21, 1930

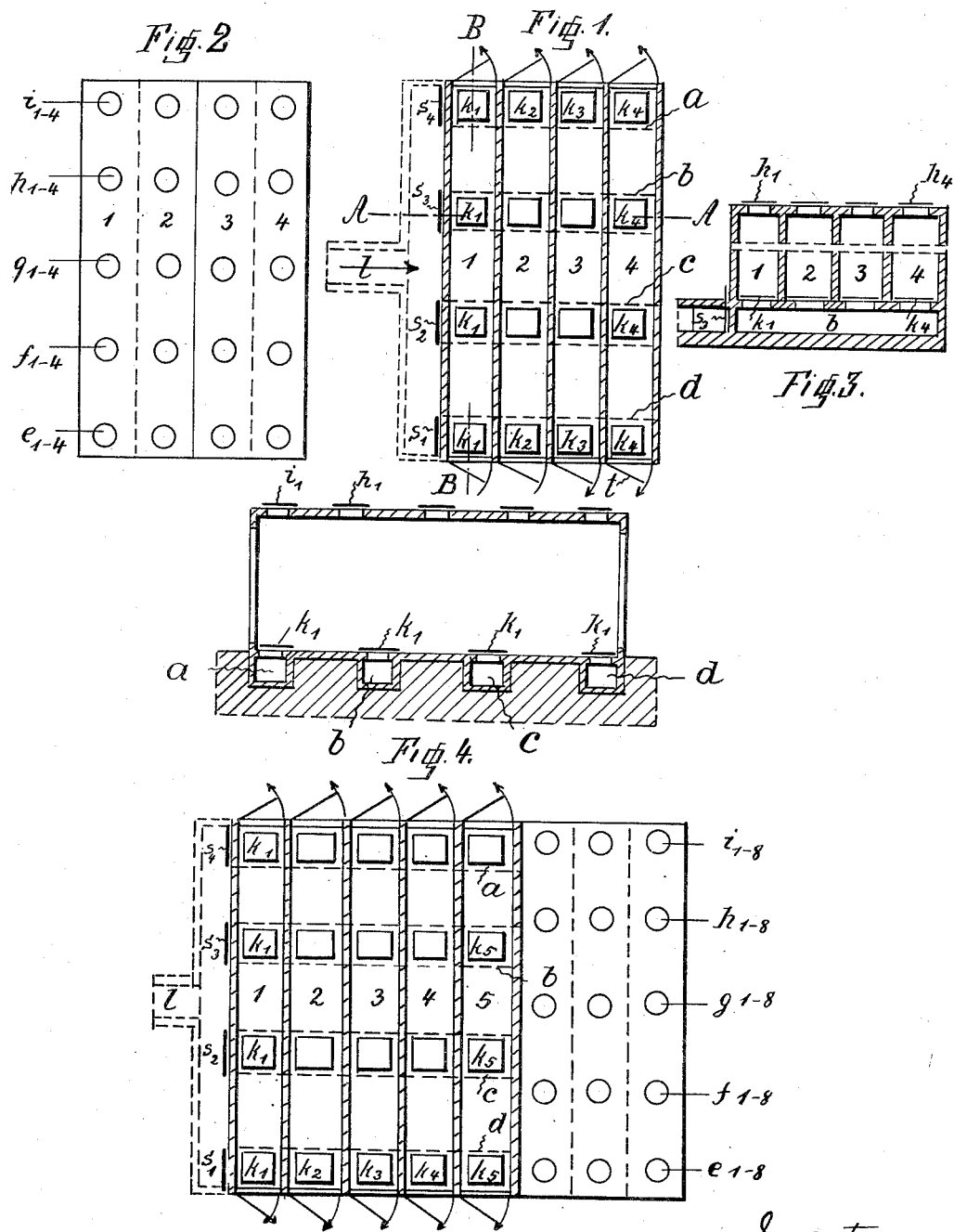

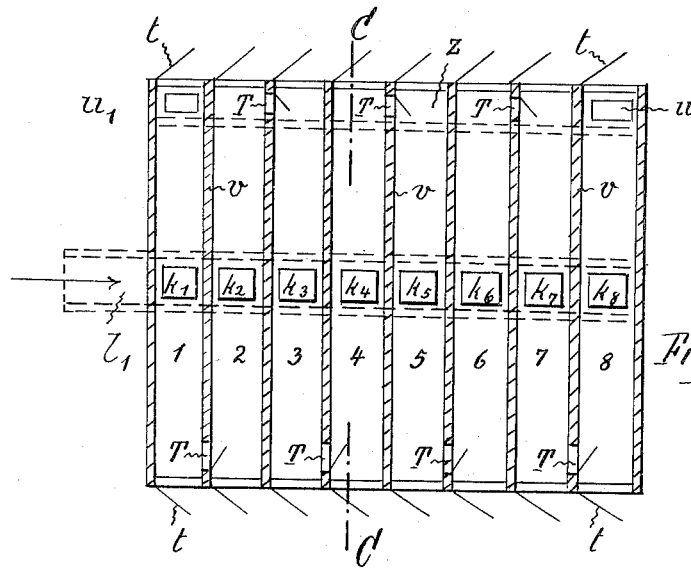
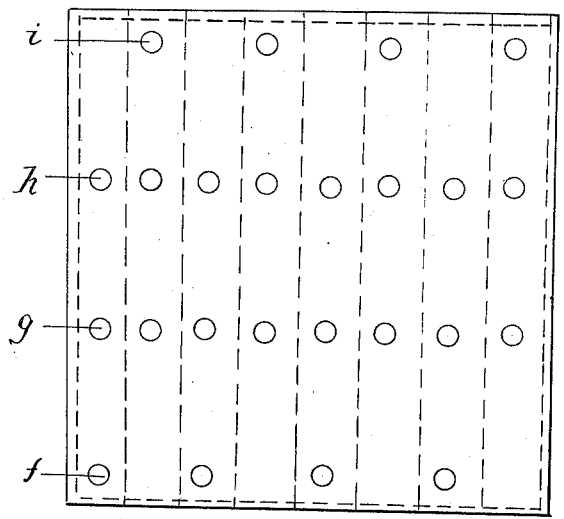
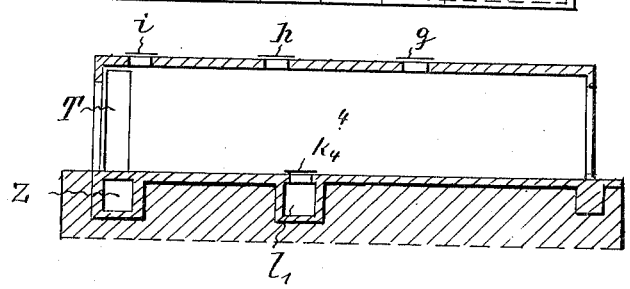

1,744,398

UNITED STATES PATENT OFFICE

KARL LÜHMANN, OF CELLE, GERMANY

METHOD OF DRYING CERAMIC ARTICLES OF ANY KIND IN DRYING CHAMBERS AND APPARATUS FOR CARRYING OUT THE METHOD

Application filed September 30, 1927, Serial No. 223,182, and in Germany October 2, 1926.

This invention relates to a method for drying ceramic articles of any kind in drying-chambers, in which the drying-zone travels through the material to be dried in the drying-chambers which communicate the one with the other and form an endless drying channel. The finished drying material can be withdrawn from the drying process chamber after chamber. The drying is carried through with the aid of moist warm air and hot air, so that according to the method the material to be dried is first treated with moist warm air, whereupon the preliminarily dried material is completely dried by means of hot air or by means of a mixture of hot air and moist air.

The movable drying zone in the juxtaposed drying chambers which are however connected the one with the other to form an endless drying channel is obtained by withdrawing from the process drying-chambers which contain perfectly dry material and by inserting fresh drying-chambers containing fresh material. The hot air supplied to the chambers is then supplied to the next following chamber and the discharge openings of the freshly inserted drying chambers are opened, from the arrangement that the drying air moves from one drying chamber to the other results the advantage, on the one hand, that moist air and hot air may be used for drying, and, on the other hand, that the drying can be carried out continuously without any interruption. According to the new method the drying zone travels in serpentine course without any interruption through the drying chambers. The heat is thus thoroughly utilized, and precipitating of water is avoided. The drying air is slowly cooled and saturated with water, so that the drying material is preliminarily heated by moist air and rendered insensitive against the subsequent action of the hot air.

For carrying out the method a drying installation is utilized which is shown, by way of example, in the Figs. 1-8 of the accompanying drawings.

Fig. 1 shows in horizontal section a drying plant composed of several chambers.

Fig. 2 shows the top plate of the drying chambers.

Fig. 3 is a cross section through the drying plant on line A—A of Fig. 1.

Fig. 4 is a longitudinal section on line B—B of Fig. 1.

Fig. 5 shows a drying plant comprising 8 chambers, partly in horizontal section and partly in top plan view.

Fig. 6 shows another form of a drying plant in horizontal section.

Fig 7 is a top plan view of Fig. 6.

Fig. 8 is a longitudinal section on line C—C of Fig. 6.

The drying plant shown in Figs. 1 to 4 consists of any desired number, for instance 4, parallel drying-chambers 1, 2, 3, 4. The ends of the drying-chambers are closed by doors $t$. Under the drying-chambers several transverse channels extend, which serve, on the one hand, for supplying hot air and, on the other hand, for producing the endless connected chambers. The transverse channels $a$, $b$, $c$, $d$, the channels $a$ and $d$ being situated at the ends of the drying chambers 1 to 4, are adapted to be connected with the channel $l$ for the supply of hot air by opening registers $s_1$, $s_2$, $s_3$, $s_4$ at the ends of the channels $a$ and $d$. The top walls of the transverse channels $a$ to $d$ have openings closed by flaps $k_1$, $k_2$, $k_3$, 4. The flaps $k_1$ to $k_4$ at the head ends of the chambers serve to connect these chambers to form an endless channel, the transverse channels $a$ and $d$ serving to connect the end chambers 1 and 4 and to return the drying air from the chamber 4 to the chamber 1. In the top wall of each chamber a number of discharging openings $i$, $h$, $g$, $f$ and $e$ arranged designated by $i_1$ to 4, $h_1$ to 4 and so forth.

The drying zone begins with the admission of drying air into one chamber and is limited by a ventilating opening in another chamber. The drying zone is moved or conveyed by the insertion of one or several chambers filled with fresh drying material and by the shutting-off of the chambers filled with completely dried material. The length of a drying zone depends on the movement of the air, the heat degrees and the moistness of the drying material. The working can be carried through with several drying zones, according to the number of chambers, 4, 8 or more chambers. The drying operation in this drying plant is as follows:—

Suppose the register $s_1$ and the flap $k_1$ of the transverse-channel $d$ and the flaps $k$, and $k_2$ of channel $a$ and discharging openings $g_2$ of the chamber 2 are open, the hot air flows then through the channel $d$ and opening $k_1$ into the chamber 1, through this chamber absorbing water from the drying material, and at the opposite end through the open flap $k_1$ into the transverse-channel $a$ and through the open flap $k_2$ into the chamber, in which the articles to be dried are then treated with the moist hot air from chamber 1. When the drying air is thoroughly saturated with water, it is made to escape, for instance through the discharging-openings $g_2$. When the air is still able to absorb water, it can be conducted through the flaps $k_2$ of chamber 2 and $k_3$ to the chamber 3 from which it is discharged into the atmosphere through one of the discharging openings, for instance $g_3$ or $h_3$. When the material to be dried situated between the channels $d$ and $c$ of the chamber 1 is dry and when the air at $g_2$ is no longer saturated with water, the register $s_1$ and the opening $k_1$ in channel $d$ are closed. The register $s_2$ is then opened and the flap $k_1$ of the channel $c$ is opened also. Hot air flows then through the open register $s_2$ into the chamber 1 and flows out of this chamber through the open end flap $k_1$ of channel $a$ and through the end-flap $k_2$ of the chamber 2 into this chamber 2, dries the material and is discharged into the atmosphere through $f_2$. At the opening of register $s_3$ of the channel $b$, the hot air flows into the chamber 1 and along the path described through the open flap $k_2$ of the channel $a$ into the chamber 2, the discharging opening $e_4$ of which is open. When the material in chamber 1 has been completely dried, this chamber may be shut off and emptied and the chamber 3, which in the meantime has been filled with fresh drying material to be dried, is inserted into the drying process. The hot air from channel $l$ will then, register $s_1$ being open and flap $k_1$ being closed and flap $k_2$ of the channel $d$ being open, flow into and through the chamber 2 and thence through $k_2$ and $k_3$ of the channel $a$ into the chamber 3, from which it is discharged through one of the discharging openings $i$ to $e$, or it is conducted into the chamber 4 when the flaps $k_3$ and $k_4$ of the channel $a$ are open. The chamber 4 is made to communicate with chamber 1 by opening the flaps $k_4$ and $k_1$ of the channel $d$.

The drying plant shown in Figs. 4 and 5 differs from the drying-plant which has just been described only in that eight drying chambers are arranged side by side, under which extend the hot air supply channels $a$, $b$, $c$ and $d$ having the flaps $k_1$ to $k_8$. The operation is the same as that of the drying plant shown in Figs. 1 to 3.

The transverse channels $a$, $b$, $c$, $d$ and the hot air-supply-channel $l$ may be arranged on the top instead of under the bottom-plate of the drying chambers. The ventilating openings may be on the lower end.

Figs. 6 to 8 show another form of construction of the drying plant. The drying channels 1 to 8 are arranged in the same manner as above described and closed at the ends by doors $t$. While in the drying plants shown in Figs. 1 to 5 the endless connection is established by the transverse-channels $a$ and $d$ and by the flaps $k_1$ to $k_4$, the communication to form an endless channel is obtained in this form of construction by doors T in partition-walls $v$. The drying air is returned from the end-chamber 8 to the first chamber 1 by means of a connecting-channel $z$ at the head end of the chambers. The hot air is supplied through a channel $l_1$ extending transversely underneath the drying chambers and having registers $k_1$ to $k_8$ in its top-wall. In the top-plate of the chambers discharging-openings $i$, $h$, $g$, $f$, each closed by a flap, are arranged.

The hot air from channel $l_1$ flows through the open flap $k_1$ into and through the chamber 1 and through the door T into the chamber 2 from which it escapes through the discharging openings $g$, $h$ or through the door T at the other end of the chamber into the chamber 3 to be discharged in saturated state through any of the discharging openings $i$, $g$, $h$, $f$ at any convenient point. The drying air is returned from chamber 8 to chamber 1 through the connecting channel $z$, in the top plate of which openings $u$, $u'$ are arranged which are adapted to be closed. The operation is similar to that described above.

Instead of arranging in each partition $v$ alternately a door T at the one and then at the other end, a door T might be provided at each end, and a second connecting channel $z$ may be arranged along the other end of the chambers.

I claim:

1. A method of drying ceramic articles in a plurality of drying chambers, which comprises causing drying air to enter any one of the drying chambers and discharge into any other drying chamber, cutting off the supply of drying air entering a chamber and directing it into another chamber containing partly dried articles, and connecting the latter chamber in series with another chamber and emptying the first chamber.

2. A method of drying ceramic articles in a plurality of drying chambers, which comprises causing drying air to enter into one chamber at any one of a number of entrances along the chamber, and directing the air from said chamber into any other chamber, cutting off the air supply to the first chamber and emptying it, and then directly supplying the second chamber with drying air and connecting it in series with any one of the remaining chambers.

3. A method for drying ceramic articles in a plurality of drying chambers, which comprises causing drying air to enter into one chamber at any one of a number of entrances along the chamber, and directing the air from said chamber through portions of other chambers in succession, then directing the drying air into the second chamber extending the series of connected chambers and discharging the first chamber.

4. A plant for drying ceramic articles, comprising a plurality of parallel drying chambers, a transverse flue between the ends of said chambers, means to connect the alternate ends of the chambers in series, means to close each such connection, means to connect each chamber with the flue, and a second flue to connect the end chambers of the series.

5. A plant for drying ceramic articles, comprising parallel drying chambers, means to supply hot air, a plurality of flues beneath the chambers connected to said means and extending transversely across all the chambers, flaps between each chamber and flue and closable connections between the flues and said means, and a plurality of discharge openings in the top of each chamber, said flues constituting means to supply hot air to the chambers as well as series connecting means between a chamber and other chamber or chambers.

In testimony whereof I affix my signature.

KARL LÜHMANN.